United States Patent Office 3,558,153
Patented Jan. 26, 1971

3,558,153
HYDROPNEUMATIC RESILIENT STRUT OR THE LIKE PROVIDED WITH LEVEL REGULATING MEANS LOCATED WITHIN THE CYLINDER HOUSING
Gunter Strauff, Kaarst, Germany, assignor to Langen & Co., Dusseldorf, Germany
Filed Dec. 23, 1968, Ser. No. 786,054
Int. Cl. B60g 15/12
U.S. Cl. 280—124     3 Claims

ABSTRACT OF THE DISCLOSURE

A hydropneumatic resilient strut or the like adapted for arrangement between a wheel supporting means and a vehicle body in which the cylinder housing is provided with a level regulating means so constructed and dependent upon the relative position of the piston rod in the cylinder to establish in a first regulating position a fluid flow between a pressure line leading to the piston space and in a second regulating position a flow in a line provided between the piston space and a drain line. In a third regulating position, namely, a neutral position, the fluid flows are blocked and a continuously operative spring means functions to move the control piston of the level regulating means into a position corresponding to the first regulating position while an extension spring means operative only within a certain stroke range related to the piston or piston rod serves to move the control piston into the second regulating position in opposition to the force of the spring means.

BACKGROUND OF THE INVENTION

This invention relates to a hydropneumatic resilient strut or the like adapted to be arranged between a wheel supporting means and a vehicle body for stabilizing the height of the vehicle body. More specifically, the invention comprises a level regulating means located within the cylinder housing, the level regulating means being defined by a multiway valve, dependent upon the relative position of the piston rod and cylinder to establish in a first regulating position fluid flow between a pressure line leading to the piston space and in a second regulating position a fluid flow in a line leading between the piston space and a drain line and in a third regulating position, namely, a neutral position the multiway valve blocks the above mentioned fluid flows with a continuous operative spring means serving to move the control piston of the multiway valve into a position corresponding to the first regulating position, while an extension spring means operative only within a certain stroke range related to the piston or piston rod serves to move the control piston into the second regulating position in opposition to the force of the spring means, with a line leading from the pressure line to the side of the control piston remote from the piston space and the control piston constituting by means of a packing face in conjunction with a corresponding portion of the cylinder housing an air tight seat which opens towards the piston space and the line leading to the piston space opening itno the piston space within such seat as set forth in my co-pending application filed Nov. 20, 1968 and entitled "Hydro-pneumatic Oleo Strut or Suspension Assemblage Provided with Level Regulating Means Located Within the Cylinder Housing."

It has been ascertained that in such struts that the desired function, namely, a tight closing or sealing of the piston space at decreasing pressure in the pressure line is properly achieved but under certain conditions a considerable amount of liquid can still escape from the piston space prior to its being tightly sealed. This is true for example in a situation where a damping throttle is installed in the line on the side of the control piston away from the piston space. In the same manner in which the damping throttle damps the movements of the control piston, a rapid closing movement of the control piston is prevented. Too low a drop is also possible when employing a central pressure reservoir in the hydraulic system since when upon stoppage of the pump the pressure drops but slowly according to the characteristics of the reservoir.

SUMMARY OF THE INVENTION

The principal object of the present invention is to make possible a rapid closing or sealing of the piston space when lacking pressure supply or an insufficiently delivering pump.

According, to the invention the problem is solved by the following components:

A spring loaded check valve which opens downstream is installed in the pressure line, A throttle is connected in parallel with the check valve, Downstream with the check valve a line branches to a two-way valve having a blocking position and a drain position which is controllable from the drain position to the blocking position by the pressure difference occurring at the throttle in opposition to the force or action of the return spring.

And, the bore in the side of the control piston away from the piston space is connected with the part of the pressure line downstream of the check valve by a line into which is connected a check valve which opens toward the pressure line.

An arrangement which is quite desirable from a space aspect results when the check valve, throttle and two-way valve are combined in one unit provided with a casing in which a piston is slidable arranged for controlling a drain aperture and to which liquid can be admitted on the end face by liquid connections with the piston being loaded by a return spring biased between a stop in the housing and defining an offset longitudinal bore in which a check valve opening downstream is installed and loaded by a spring which rests against a stop in the piston and which is relatively stronger than the return spring, with the check valve having an overflow aperture defining a throttle point and in order to maintain the piston permanently in the blocked position during operation, a pressure limiting valve obtaining the hydraulic cycle is located downstream of the throttle.

Additional important objects and advantages of the invention will become more readily apparent to persons skilled in the art from the ensuing detailed description and annexed drawings and in which drawings:

DETAILED DESCRIPTION OF THE INVENTION

Figure 1:
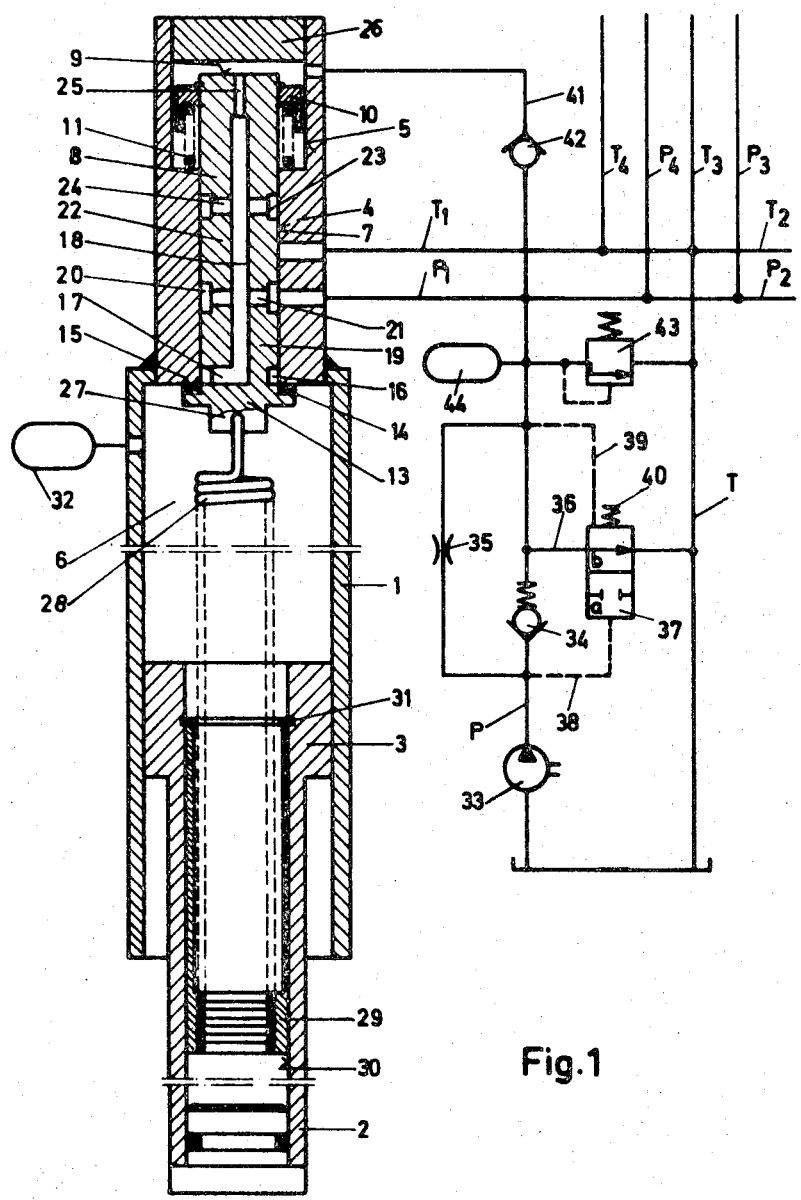
FIG. 1 is a view in axial cross-section of the hydropneumatic resilient strut with the hydraulic circuitry employed therewith being illustrated diagrammatically.

With reference to FIG. 1, it will be noted that a piston 3 having a piston rod 2 is slidably mounted in a cylinder 1 provided with a cylinder head 4. The cylinder head 4 is formed with an axially extending bore 5 which joins with a second axially extending bore 7 of lesser cross-sectional area and the bore 7 opens into a piston space 6 provided between the piston 3 and the lower surface of the cylinder head 4. A control piston 8 is slidably disposed in the bore 7 and the piston 8 extends into both the bore 5 and the piston space 6. Adjacent end 9 of the control piston 8 which is remote from the piston space 6, the control piston carries a resilient cup shaped member 10 and a spring 11 is biased between a shoulder 12 of the bore 5 and the end of the cup shaped member 10.

At the opposite end of the control piston, namely, that end which extends into the piston space 6 the piston is provided with a collar or flange 13 having a packing 14 to provide a sealing surface 15 which cooperates with the lower end of the cylinder head 4 to constitute a hermetic or air tight seat. The control piston 8 in proximity to the packing 14 is provided with an annular groove 16 which is connected by a transverse bore 17 with a blind bore 18 extending axially of the control piston and terminating in an opening at the end 9. A second annular groove 20 is separated from the annular groove 16 via a shoulder 19 and the groove 20 communicates with the axial bore 18 through a transverse bore 21. A third annular groove 23 is spaced axially of the groove 20 by a shoulder 22 and the groove 23 is connected with the bore 18 by a transverse bore 24.

A passage $p$ for a pressure line is so disposed in the cylinder head 4 that it terminates in the zone or area of the groove 20 when its seat is closed. In this position, the shoulder 22 of the control piston 8 closes a passage $t$ leading to a drain line and the shoulder 22 is so dimensioned that in the neutral position, the shoulder closes both the passage $t$ and the passage $p$. Upon still further movement of the control piston 8, the annular groove 23 enters the zone of the passage $t$ leading to the drain line and the bore 18 is provided with a throttle point 25. The bore 5 is closed by a cover or plug 26.

It will be seen that the end of the control piston which extends into the piston space 6 and denoted 27 has connected thereto one end of an extension spring 28 while the other end of the spring is attached to a sleeve 29 which is slidable in a blind bore 30 provided in the piston 3 and the piston rod 2. The stroke of the sleeve is limited by a stop 31 and it will be noted that a portion of the sleeve 29 is threaded and into which threaded portion the spring 29 is threaded to effect the attachment for the spring 28.

A hydro-pneumatic pressure reservoir denoted diagrammatically at 32 is operably connected to the piston space 6.

In FIG. 1 it will be noted that pressure line P1 similar to pressure lines P2, P3 and P4 which lead to additional resilient struts for the vehicle, open into a pressure line P. Similarly, drain lines T1, T2, T3 and T4 combine in a drain line T.

The pressure line P is fed by a pump 33 and a spring loaded check valve 34 which opens downstream is located in the pressure line P. A throttle 35 is arranged parallel with the check valve 34 and downstream of the throttle 35 a line 36 branches to a two-way valve 37 having a blocking position $a$ and a drain position $b$ which is controllable from the drain position to the blocking position by the pressure difference occurring at the throttle 35 via control lines 38 and 39 in opposition to the force of a return spring 40. The bore 5 is connected with the part of the pressure line P lying downstream of the valve 34 by a line 41 and a check valve 42 opening in the direction of the pressure line is arranged in the line 41. A pressure limiting valve 43 connects the pressure line P with the drain line T downstream of the check valve 34 and also downstream of the check valve 34, a central pressure reservoir 44 is connected to the pressure line P.

Figure 2:
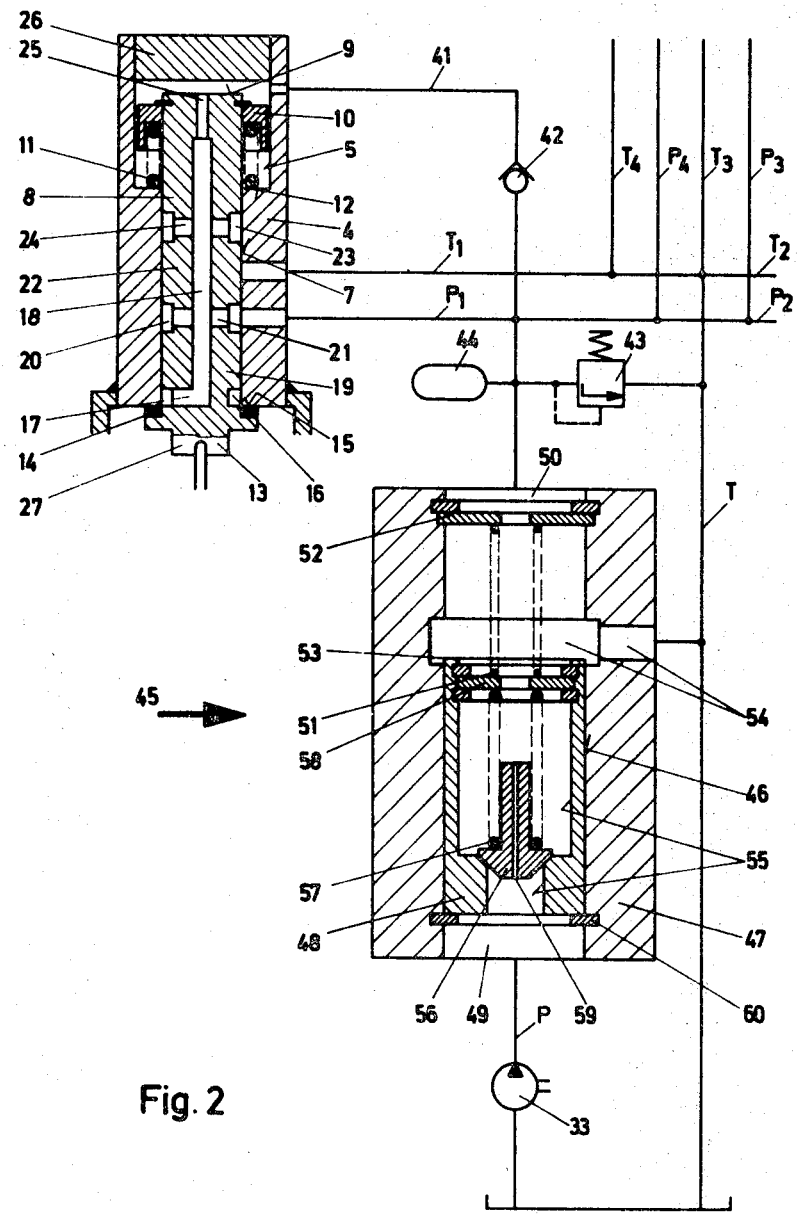
FIG. 2 is a diagrammatic view illustrating a plurality of the individual components being combined into one unit.

With reference to FIG. 2 it will be noted that a unit denoted generally 45 includes a spring loaded check valve, a throttle, and a two-way valve. In a bore 46 of a casing 47 a piston 48 is slidably mounted and the end face of the piston 48 can be supplied with liquid via connections 49 and 50 communicating with the bore 46. In addition, the piston 48 is loaded by a return spring 51 which is supported against a stop 52 in the casing 47. A control edge of the piston 48 which is located downstream on the end face serves for opening and closing a drain aperture or opening 54. In an offset longitudinal bore 55 of the piston 58 is arranged a check valve 56 which opens downstream and is loaded in the closing direction by a spring 57 which is supported against a stop 58 in the piston 48 and a small overflow opening 59 is provided in the check valve 56. In addition to the stop 51, a further stop 60 functions for limiting the stroke of the piston 48 and at the connections 49 and 50 the pressure line P is connected with the connection 49 being directed toward the pump 33.

The operation of the resilient strut is as follows:

With the vehicle on which the strut is installed being stationary and no pressure existing in the pressure line connected to the passage $p$, the packing 14 is positioned hermetically on the corresponding part of the cylinder head 4 and hermetically sealed to the piston space 6. The sleeve 29 abuts against the stop 31 and when the pressure line leading to the passage $p$ is pressurized, this pressure is applied via the annular groove 20, the transverse bore 21, the axial bore 18 and the throttle area 25 to the end 9 of the piston 8 whereby the pressure exerted on the end 9 displaces the piston 8 counter to the pressure existing in the piston space 6 and counter to the action of the spring 11. Hence, the sealing surface is displaced from its seat and communication is established between the piston space 6 and the annular groove 16 so that fluid flows from the passage $p$ via the annular groove 20, the transverse bore 21, the bore 18, the transverse bore 17 and the annular groove 16 into the piston space 6. Due to the seat, the face of the piston 8 loaded from the piston space 6 is somewhat greater than that which is effected on the remote end 9 of the control piston 8. To open the control piston 8 the pressure existing in the components $p$ 16, 17, 18, 20, 21, 23, 24, 25 and 9 must be greater than the pressure existing in the piston space 6. According to this pressure difference and the quantity of fluid flow the aperture gap adjusts itself and due to the inflowing fluid, the piston 3 is extended thus taking along the sleeve 29 and spring 28 over the stop 31. It should be noted that the spring 28 is of greater strength than the spring 11 and a movement of the spring 28 accordingly is transmitted initially to the conrol piston 8.

The movement of the piston 3, the bushing 29, the spring 28 and the control piston 8 occurs approximately when the shoulder 22 of the piston 8 has almost closed the passage $p$ of the pressure line. The fluid flowing through the ever narrowing gap functions only for the compensation of leakages losses.

When the vehicle is relieved, the fluid flows back from the reservoir 32 into the piston space 6 and brings about an additional extension of the piston 3 via the sleeve 29 and the spring 28 with the control piston being pulled along and assuming a position in which the annular groove 23 communicates with the passage $t$ of the drain line with fluid capable of then flowing out of the piston space 6. By virtue of this action, the piston 3 again retracts and the control piston 8 is displaced by the pressure difference acting thereupon and the force of the spring 11 until the shoulder 22 again closes the passage $t$ of the drain line. Upon a further sinking or dropping, the connection between the passage $p$ of the pressure line and the annular groove 20 is again established.

If, for example, in this position the pressure in the passage $p$ of the pressure line drops, the control piston will be displaced by the reasons previously set forth until the sealing surface again effects a hermetic seal. Since this closing cycle occurs very rapidly, the piston 3 remains substantially in the same position in which the power failure occurred.

The resilient movements of the piston 3 which are generally much greater than the comparatively small travel paths of the control piston 8 do not act on the control piston to the full extent. Upon elastic contraction there is no connection whatsoever since the sleeve 29 idles. Upon elastic tension, the spring 28 falls or draws the control piston 8 in a downward direction until the cup shaped member 10 strikes the shoulder 12 of the bore 5. Greater outward movements of the piston are reflected only in an expansion of the spring 28.

It should be mentioned that the regulating positions illustrated in FIGS. 1 and 2 correspond to that condition which finally adjusts itself when the pressure line P is free of pressure. When the pump 33 is activated, fluid is conveyed into the pressure line P and a part of the fluid flows through the throttle 35 or the overflow aperture 59. The cross-section of the throttle 35 of the overflow aperture 59 is so dimensioned that a pressure head results when the pump 33 is operating. This pressure head is sufficient initially to connect the two-way valve 37 counter to the force of the return spring 40 to the blocking position or lift the piston 48 counter to the force of the return spring 51 so that it blocks the drain aperture 54. The check valve 34 or 56 then remains closed. Only when the two-way valve 37 or piston 48 has been switched does the pressure head assume a still greater value in order that the check valve 34 or 56 opens.

The fluid passes the pressure line P or P1 into the annular groove 20 and thence via the bore 18 and throttle point 25 into the bore 5. The check valve 42 remains closed since the pressure in the line P is, due to flow resistances, at least somewhat greater than that existing in the bore 5. As the pressure limiting valve 43 is arranged downstream of the check valve 34 or 56, a prominent through flow and consequently a stay of the two-way valve 37 in the blocking position a or of piston 56 in its blocking position is maintained.

In the event of a pipe rupture or when the pump 33 is inoperative, flow will no longer occur in the pressure line. P. Due to this, the check valve 34 or 56 opens and consequently the lacking pressure difference in the control lines 38 and 39 or in the connections 49 and 50 means that only the return spring 40 or 51 functions and by which the two-way valve 37 is brought into the drain position b and the piston 48 into a position clearing the drain aperture 54. In this regulating position, the part of the pressure line P located downstream and hence components 20, 21, 18, 25, 5, 41 and 42 are connected with the drain line T.

The switching of the two-way valve 37 is made possible by the throttle 35 or 59 since a rapid volume equilization from one to the other side of the two-way valve 37 or of piston 48 is possible. Moreover, the liquid in the bore 5 can expand rapidly and is conveyed by the control piston 8 by the now automatically opening check valve 42 into the pressureless pressure line P and thence into the drain line T. As the pressure in the bore 5 collapses suddenly, the control piston 8 is moved rapidly into the position blocking the piston space 6 by the pressure in the piston space 6.

Various arrangements are possible within the scope of the invention and the individual elements may be cased as well as combined in a structural unit. Furthermore, it is possible to associate with each resilient strut its own relief device or employ one unit 44 jointly for all of the resilients struts so that only the check valve 42 must be present in a greater number. Finally, it is immaterial whether the unit 44 is arranged in the area of the pump 33 or in the area of one or several resilient struts. For example, the throttle 35 may be a screw type nozzle, a small bore, annular gap, notch or the like and the check valve 34 need not necessarily be an absolutely air tight seat valve but may be in the nature of a sleeve valve.

What I claim is:

1. In a hydropneumatic resilient strut and the like adapted to be arranged between a wheel supporting means and a vehicle body, a cylinder, a head for the cylinder, a piston slidable in the cylinder and a level regulating means located within said head, the level regulating means including a control piston movable in a bore provided in the cylinder head, the cylinder head having passages leading to a pressure line and a drain line respectively, with said passages communicating with said bore, the control piston having opposite ends with the end remote from the cylinder extending into an enlarged space of said bore in the cylinder head, the opposite end of the control piston extending into a piston space provided in said cylinder between the piston head and the cylinder head, the control piston having means defining a flow path therein between the pressure passage and the end of the control piston remote from the piston space, said end of the control piston extending into the piston space having means together with the cylinder head providing a hermetic seal opening in the direction of the piston space, the control piston having a flow path therein for providing communication between pressure passage and the piston space, said level regulating means dependent upon the relative position of the piston rod and the cylinder establishing in a first position a flow connection between the pressure passage and the piston space, in a second position a flow connection between the piston space and the drain passage and a neutral position blocking such flow connections, a continuously operative spring means operably related to the control piston functioning to move the control piston into a position corresponding to said first control position, an extension spring connected to the end of the control piston extending into the piston space and to said piston operative only within a certain stroke range for moving the control piston into the second position against the force of the continuously operative spring, a line leading from the pressure line to the side of the control piston remote from the piston space, said control piston defining, by means of a packing face together with a portion of the cylinder the air tight seat opening toward said piston space, the line leading to said piston space opening into said piston space within said seat, a spring loaded check valve in said pressure line opening downstream, a throttle in said pressure line parallel to said check valve, a line downstream of said check valve branching to a two-way valve, said two-way valve having a blocking position and a draining position, said draining position being controllable from the drain position to the blocking position by the pressure difference occurring at said throttle counter to the force of a return spring, the bore in the side of said control piston remote from the piston zone being connected with a part of the pressure line located downstream of said check valve by a line, and a check valve opening in the direction of said pressure line located in said line downstream of said first mentioned check valve.

2. The hydropneumatic resilient strut as claimed in claim 1 in which said check valve, throttle, and two-way valve are combined in a unitary structure, said unitary structure including a casing, a piston slidably arranged in said casing, controlling a drain aperture therein and liquid connections on the end face for admitting liquid to said piston, a return spring supported against a stop in said casing loading said piston, said casing having an offset longitudinal bore, a check valve installed in said longitudinal bore opening downstream, a spring loading said last mentioned check valve, a stop in said piston supporting said spring, and said last named spring being relatively stronger than said return spring, and said check valve in said offset longitudinal bore having an overflow aperture providing a throttling point.

3. The hydropneumatic elastic strut as claimed in claim 2 including a pressure limiting valve arranged downstream of the throttle for obtaining the hydraulic cycle.

References Cited

UNITED STATES PATENTS 3,250,526  5/1966  Kress _____ 280—124F
2,879,795  3/1959  Rossman _____ 267—65D PHILIP GOODMAN, Primary Examiner U.S. Cl. X.R.

267—64

UNITED STATES PATENT OFFICE
CERTIFICATE OF CORRECTION

Patent No. 3,558,153          Dated January 26, 1971

Inventor(s) GÜNTHER  S T R A U F F

It is certified that error appears in the above-identified patent and that said Letters Patent are hereby corrected as shown below:

CORRECT THE SPELLING OF INVENTOR"S FIRST NAME TO

— GÜNTHER —.

Signed and sealed this 3rd day of July 1973.

(SEAL)
Attest:

EDWARD M. FLETCHER, JR.　　　　　　　Rene Tegtmeyer
Attesting Officer　　　　　　　　　　Acting Commissioner of Pat